United States Patent Office 3,385,802
Patented May 28, 1968

3,385,802
FOAMED POLYESTER COATINGS CONTAINING COAL AS FILLER
George E. Trieschock, Westfield, N.J., assignor, by mesne assignments, to United States Steel Corporation, Pittsburgh, Pa., a corporation of New Jersey
No Drawing. Filed July 30, 1964, Ser. No. 386,446
4 Claims. (Cl. 260—2.5)

ABSTRACT OF THE DISCLOSURE

Novel coatings for concrete and metal have been prepared using unsaturated polyester/vinyl monomer as the vehicle, and coal, either anthracite or bituminous, as a filter. The coating can be foamed to provide an insulating layer as well as a protective coating.

This invention relates to coal containing compositions.

It is an object of the present invention to prepare novel coal compositions.

Another object is to prepare novel protective coatings.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by employing coal as a reactive filler with polyester resins which are the reaction product of an ethylenically unsaturated alkyd resin and a polymerizable ethylenically unsaturated monomer.

The products of the present invention are useful as external and internal coatings for concrete pipes and concrete slabs, as coatings for concrete and asphalt pavements, as coatings for metals such as steel and aluminum pipes and sheets, as coatings, for wood, as coatings for underwater applications, e.g. boat hulls, as coatings for hydraulic cements, e.g. Portland cement and magnesium oxychloride cement, and as external and internal coatings for asbestos pipes. When pavements are coated with the composition of the invention it is frequently desirable to include an abrasive filler.

The polyester can be made from glycols such as ethylene glycol, diethylene glycol, propylene glycol, dipropylene glycol, trimenthylene glycol, 2,3-butanediol, 1,3-butanediol, tetramethylene glycol, neopentyl glycol, butene-2-diol-1,4-tetrachlorobutanediol-1,4, and an unsaturated dibasic acid (or anhydride thereof if available) such as maleic acid, fumaric acid, itaconic acid, citraconic acid, mesaconic acid, cis-3,6-endomethylene delta 4-tetrahydrophthalic acid, hexachloro-3,6-endomethylene and delta 4-tetrahydrophthalic anhydride. A portion of the unsaturated acid, e.g. up to 80% by weight can be replaced by saturated aliphatic or aromatic polycarboxylic acids such as succinic acid, adipic acid, phthalic acid, terephthalic acid, sebacic acid, azelaic acid, tetrachlorophthalic acid, trimesic acid, hemimellitic acid, trimellitic acid, malic acid, pimelic acid, suberic acid and citric acid and their anhydrides (if available).

Maleic and fumaric acids, with or without a saturated polycarboxylic acid modifier are the most desirable acids.

The ethylenically unsaturated alkyd resin is usually from 15 to 95%, preferably 30 to 85%, of the total weight of itself and the polymerizable monomer.

As the ethylenically unsaturated monomer there can be used styrene, p-vinyl toluene, o-vinyl toluene, m-vinyl toluene, alpha-methyl styrene, triallyl cyanurate, diallyl phthalate, methyl methacrylate, ethyl acrylate, ethylene glycol dimethacrylate, vinyl acetate, o-chlorostyrene, cyclopentadiene and triallyl melamine.

The polymerizable monomer acts as a cross-linking agent for the unsaturated alkyd resin. Typical examples of polyesters which can be employed are diethylene glycol-dipropylene glycol-adipate-maleate modified with either styrene or diallyl maleate, propylene glycol-dipropylene glycol-maleate-phthalate modified with styrene, etc. Such esters per se are old and well known in the art.

As is customary in the polester are a free radical containing curing agent is used in an amount of 0.1–10% by weight of the polyester. Typical examples of such curing agents include inorganic peroxide such as barium peroxide, sodium peroxide and hydrogen peroxide, organic peroxide and hydroperoxides, e.g. acetyl peroxide, lauroxyl peroxide stearoxyl peroxide, benzoyl peroxide, acetyl benzoyl peroxide, bis($\alpha,\alpha$-dimethylbenzyl) peroxide, acetone peroxide, methyl ethyl ketone peroxide, triacetone peroxide, ethyl hydrogen peroxide, diethyl peroxide, di $\alpha$-cumyl peroxide, cumene hydroperoxide, 4-chlorobenzoyl peroxide, tertiary butyl hydroperoxide, tertiary butyl $\alpha$-cumyl peroxide and di-t-butyl peroxide, per esters, e.g. t-butyl perbenzoate and di-t-butyl perphthalate, perborates, e.g. sodium perborate and potassium perborate, sodium percarbonate, aliphatic azo compounds, e.g. 2-azo-bis-isobutyronitrile, tetraethyl lead, tetramethyl lead, tin tetraphenyl and other organometallic compounds. Curing can be accomplished at room or elevated temperature. Foamed products can be obtained by using a gas liberating curing agent such as azobisiso-butyronitrile and other azo compounds or sulfonyl hydroazides and dihydrazides, e.g. p,p'-oxybis(benzenesulfonyl hydride) p,p'-diphenylbis-(sulfonyl hydrazide) and m-benzene-bis (sulfonyl hydrazide).

As the coal there can be used either anthracite coal or bituminous coal with the bituminous coal being preferred. The coal is generally ground to 20 mesh (Tyler) or less, preferably to pass through a 140 mesh screen (Tyler) although coarser products, e.g. up to 10 mesh can be employed.

Generally 5 to 95 parts of coal are used with 95 to 5 parts of polyester resin. The coal is usually 15 to 85% of the total of coal plus polyester resin and is preferably 40 to 60% of such total.

The coal employed reacts with the polyester resin. The coal also serves as a plasticizer for the resin and also as a diluent. Coal can serve all of these functions because it is a complex mixture of many materials.

The coil can be the only filler present but frequently it is desirable to add 1 to 100% by weight of the coal of other organic or inorganic fillers such as asbestos, glass fibers, sand, talc, calcium carbonate, titanium dioxide, wood flour, cellulose, mica, blast furnace slag, clays, e.g. kaolin and bentonite, lignin, aluminum oxide, iron oxide, cement, silicon carbide and diatomaceous earth.

Unless otherwise indicated all parts and percentages are by weight.

There can also be added a thixotropic agent such as Cab-O-Sil (a flame hydrated silica) for quaternary ammonium clays such as Bentone 34 (dimethyl dioctadecyl ammonium bentonite), usually in an amount of 0.5–3% of the total composition.

There can also be employed metallic driers with the peroxide catalysts. Suitable driers include manganese naphthenate, cobalt naphthenate, cobalt octoate, iron naphthenate.

Example 1

| | Parts |
|---|---|
| Laminac 4151 | 200 |
| Bituminous coal | 200 |

The Laminac 4151 and the coal were mixed together and there were added 4 parts of methyl ethyl ketone peroxide and the mixture cured at 90° C. for 12 minutes.

The mixture can be applied to a concrete slab or concrete pipe or steel sheet or pipe prior to curing to produce a coated product.

Laminac 4151 is a commercial polyester resin in liquid form composed of an ethylenically unsaturated alkyd resin dissolved in monomeric styrene.

Example 2

A coating composition was prepared by preparing an initial mixture from (a) 54% by weight of (1) 3 parts of a mixture of a rigid polyester which is the condensation product of propylene glycol and dipropylene glycol in the ratio of 1 to 3 with phathalic anhydride and maleic anhydride in the ratio of 3 to 2 (2) 1 part of a flexible polyester resin which is the condensation product of ethylene glycol nad diethylene glycol in the ratio of 1 to 3 with phthalic anhydride, maleic anhydride and adipic acid in the ratio of 1 to 2 to 2 and (b) 46% of monomeric styrene.

To 50 parts of this initial mixture there was added 13 parts of monomeric styrene, 2 parts of Bentone 34 and 8 parts of methyl ethyl ketone peroxide. The mixture was then applied to a concrete slab and cured in live steam at 100° C. for 30 minutes to give a tough waterproof coating.

Example 3

A solid unsaturated alkyd resin was prepared from 1266 parts of phthalic anhydride, 636 parts of maleic anhydride, 501 parts of dipropylene glycol and 855 parts of propylene glycol. The resin had an acid number of 35. This resin was diluted with 1284 parts of monomeric styrene. This mixture is called hereinafter Composition A.

To 52 parts of Composition A there were added 1.5 parts of benzoyl peroxide, 1.5 parts of methyl ethyl ketone peroxide, 18 parts of styrene and 210 parts of bituminous coal (−200 mesh). The mixture was applied to a concrete block and cured for 1 hour at 100° C. to give a tough, waterproof coating.

In place of bituminous coal in Example 3 there was used anthracite coal with similar results.

Example 4

The polyester resin material employed was a mixture of 50 parts of ethylene glycol-diethylene glycol (1:1 mol ratio)-adipate-maleate (1:1 mol ratio) and 50 parts of monomeric styrene. There was added 2 parts of tertiary butyl peroxide and 60 parts of bituminous coal and the composition applied to a steel plate and allowed to cure at room temperature over a period of several days to get a hard coating. Curing can be hastened by heating, e.g. to 90° C. for 15 minutes.

Example 5

To 50 parts of Composition A there were added 3 parts of azobisisobutyronitrile, 15 parts of styrene and 70 parts of bituminous coal (−200 mesh). The mixture was applied to a steel plate and cured at 125° C. for 30 minutes to form a foamed, hard coating on the plate. Foaming occurred because the curing was carried out above the decomposition temperature of the azobisisobutyronitrile.

The foamed products such as the one prepared in Example 5, for example, can be used to provide an insulating layer as well as a protective coating.

What is claimed is:

1. A concrete surface coated with a foamed cured mxiture of (1) a polyester comprising an ethylenically unsaturated alkyd resin wherein the unsaturation is derived from an alpha,beta ethylenically unsaturated dibasic acid and a polymerizable liquid vinyl monomer, and (2) coal of 10 mesh size and smaller.

2. A concrete surface according to claim 1 wherein the alkyd resin is a polyester of an alpha,beta ethylenically unsaturated acid and an aliphatic glycol and the monomer is a vinyl aromatic monomer.

3. A metal surface coated with a foamed cured mixture of (1) a polyester comprising an ethylenically unsaturated alkyd resin wherein the unsaturation is derived from an alpha,beta ethylenically unsaturated dibasic acid and a polymerizable liquid vinyl monomer, and (2) coal of 10 mesh size and smaller.

4. A metal surface according to claim 3 wherein the alkyd resin is a polyester of an alpha,beta ethylenically unsaturated acid and an aliphatic glycol and the monomer is a vinyl aromatic monomer.

References Cited

UNITED STATES PATENTS

| 2,624,714 | 1/1953 | Bigelow | 260—40 |
| 2,843,556 | 6/1958 | Moorman | 260—28.5 |
| 3,075,942 | 1/1963 | Bozer et al. | 260—40 |
| 3,227,665 | 1/1966 | Fourcade et al. | 260—40 |
| 1,358 | 10/1839 | Chater | 106—307 |
| 2,370,428 | 2/1945 | Stillman | 106—307 |

FOREIGN PATENTS

| 1,054,703 | 4/1959 | Germany. |

MURRAY TILLMAN, *Primary Examiner.*

J. T. GOOLKASIAN, *Assistant Examiner.*